United States Patent
Kemper

(10) Patent No.: US 7,261,200 B1
(45) Date of Patent: Aug. 28, 2007

(54) ASSEMBLY FOR MOVING AND ROTATING CONVEYOR

(75) Inventor: Rainer Kemper, Nortrup (DE)

(73) Assignee: Spudnik Equipment Company, LLC, Blackfoot, ID (US)

( * ) Notice: Subject to any disclaimer, the term of this patent is extended or adjusted under 35 U.S.C. 154(b) by 0 days.

(21) Appl. No.: 11/652,321

(22) Filed: Jan. 8, 2007

(51) Int. Cl.
*B65G 21/10* (2006.01)
(52) U.S. Cl. .................................. 198/632; 198/581
(58) Field of Classification Search ............... 198/300, 198/312, 313, 581, 583, 584, 632, 861.2
See application file for complete search history.

(56) References Cited

U.S. PATENT DOCUMENTS

| | | | |
|---|---|---|---|
| 3,592,331 A | | 7/1971 | Morgan |
| 3,616,893 A | * | 11/1971 | Knadle et al. .............. 198/632 |
| 3,722,673 A | | 3/1973 | Bedwell |
| 3,750,858 A | | 8/1973 | White |
| 4,157,005 A | | 6/1979 | Orlando |
| 5,044,484 A | * | 9/1991 | Douglas .................... 198/313 |
| 5,083,978 A | | 1/1992 | Royneberg |
| 5,086,911 A | * | 2/1992 | Douglas .................... 198/632 |
| 5,333,725 A | * | 8/1994 | Douglas .................... 198/632 |
| 5,443,351 A | | 8/1995 | Pettijohn |
| 5,819,950 A | * | 10/1998 | McCloskey .............. 198/313 |
| 6,708,814 B2 | | 3/2004 | Wagstaffe |

* cited by examiner

*Primary Examiner*—James R. Bidwell
(74) *Attorney, Agent, or Firm*—Rigby, Andrus & Moeller, Chtd

(57) ABSTRACT

The invention is an assembly for moving and rotating a conveyor from a operational orientation to a transport orientation. The assembly includes: an actuator operatively connecting to a first frame; an arm operatively connecting to the actuator and pivotally connecting to a first frame; a support sub-assembly operatively connected to the first frame and selectively rotatable around an axis and moveable forward and rearward along the axis, the support assembly operatively connecting to a conveyor frame; a first turnbuckle pivotally connected to the arm and to the support sub-assembly; and a second turnbuckle pivotally connected to the first frame and to the support sub-assembly. The assembly may further include a second actuator operatively connected to the first frame and operatively connected through a plurality of pivotally attached connection arms to a hopper.

20 Claims, 10 Drawing Sheets

ASSEMBLY FOR MOVING AND ROTATING CONVEYOR

TECHNICAL FIELD

This invention relates to an assembly for moving and rotating a conveyor. More specifically, the invention relates to an assembly for selectively rotating a conveyor frame, particularly a frame for an endless conveyor attached as an elevator to a potato harvester around an axis from an operational orientation to a folded transport orientation while moving the conveyor frame forward and rearward along the axis.

BACKGROUND OF THE INVENTION

Processes for harvesting potatoes are well known. In a typical commercial practice potatoes are removed from the earth by a mechanized harvester having a plurality of hoppers and conveyors that collect, transport and elevate harvested potatoes to an elevated terminal discharge end of a final conveyor, the final conveyor frequently being a boom. The potatoes are then dropped from the terminal discharge end and piled into a mechanized transporter, the transporter frequently being a truck having a bed with a conveyor system therein. After being first piled into the truck's bed, potatoes may then be transported to a climate controlled storage or processing site.

Potatoes are typically grown in a series of spaced apart rows and use of wider conveyors on a harvester can accordingly produce greater ease, efficiency and speed in harvesting potatoes. Conversely, however, use of wider conveyors on a mechanized harvester can increase the harvester's width and thereby make the process of transporting the harvester from one harvest site to a next harvest site more difficult, time consuming and expensive. Greater harvester width can even result in a harvester being precluded by law or by physical limitations like, for example, limited road width from using otherwise convenient paths between harvest sites.

Various inventions to reduce the transport dimensions of a harvester during transport have accordingly been proposed. These typically involve complicated assemblies or time consuming means for folding and reorienting conveyors associated with the harvester. Some involve the complicated folding of multiple frame segments of a single conveyor. Some require use of multiple, separate actuators and even additional tools to effectuate the folding and reorientation of even a single conveyor from an operational orientation to a transport orientation. Yet further, many involve reconfiguration of the conveyor in a transport orientation that differs significantly from the conveyor's operation orientation and which can markedly reposition the harvester's center of mass and even affect the harvester's stability.

While various devices particularly from outside the potato processing field include some of the general structural and operational features of the present invention, no previously known device includes the overall structural and functional features of the present invention. These overall structural and functional features promote efficiency, simplicity and ease of operation and allow the present invention to: (1) rapidly and selectively rotate a conveyor around a single axis between a stable operational orientation and a stable transport orientation while simultaneously moving the conveyor rearward along the axis to clear a path for rotation of a hopper from an operational configuration beneath a discharge end of the conveyor to a folded transport configuration; and (2) selectively rotate the conveyor around the single axis between the transport orientation and the operational orientation while simultaneously moving the conveyor forward along the axis to an operational configuration with a discharge end of the conveyor positioned over the hopper.

SUMMARY OF THE INVENTION

It is an object of this invention to provide an assembly for moving and rotating a conveyor. More specifically, it is an object of this invention to provide an assembly for: (1) selectively rotating a conveyor around a single axis between a stable operational orientation and a stable transport orientation while simultaneously moving the conveyor rearward along the axis preferably to clear a path for rotation of an associated hopper from an operational configuration beneath a discharge end of the conveyor to a stable transport configuration; and (2) selectively rotating the conveyor around the single axis between the transport orientation and the operational orientation while simultaneously moving the conveyor forward to a stable operational configuration preferably with a discharge end of the conveyor positioned over the hopper. A preferred embodiment of the assembly includes: (1) an actuator operatively connecting to a first frame; (2) an arm operatively connecting to the actuator and pivotally connecting to the first frame; (3) a support sub-assembly operatively connected to the first frame, selectively rotatable around an axis and simultaneously moveable forward and rearward along the axis, the support assembly operatively connecting to the conveyor frame; (4) a first turnbuckle pivotally connected to the arm and to the support sub-assembly; and (5) a second turnbuckle pivotally connected to the first frame and to the support sub-assembly. An embodiment of the assembly may further include a second actuator operatively connected to the first frame and operatively connected through a plurality of pivotally attached connection arms to a hopper.

Another object of a preferred embodiment of this invention is to provide an assembly in accordance with the foregoing paragraph wherein the actuator, arm and first turnbuckle facilitate selective rotation of the support sub-assembly around the axis between a stable operational orientation and a stable transport orientation and the second turnbuckle influences the conveyor frame to move selectively forward and rearward as the support sub-assembly is rotated around the axis.

Another object of a preferred embodiment of this invention is to provide an assembly wherein a single hydraulic ram actuates rotation around the axis and movement forward and rearward of the conveyor frame.

Another object of this invention is to provide an assembly wherein the axis around which the conveyor is rotated does not intersect any part of the conveyor.

Another object of a preferred embodiment of this invention is to provide an assembly in accordance with the foregoing four paragraphs wherein the axis is disposed parallel to a plane, the plane including a longitudinal midline of the conveyor frame.

Another object of the invention is to provide an assembly with the stability, ease and simplicity of an invention having a minimum number of component parts and requiring only a single automated step to selectively, rapidly and efficiently rotate the conveyor around a single axis between a stable operational orientation and a stable transport orientation while simultaneously moving the conveyor selectively forward and rearward and thereby clearing a path for selective rotation of the hopper between a stable operational configuration beneath a discharge end of the conveyor and a stable transport configuration upon the first frame.

Another object of this invention is to provide an assembly in accordance with the preceding objects which will conform to conventional forms of manufacture, be of comparatively simple construction and easy to use so as to provide an assembly that will be economically feasible, durable and relatively free of trouble in use and operation.

These together with the other objects and advantages of the invention which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF INVENTION

Figure 1:
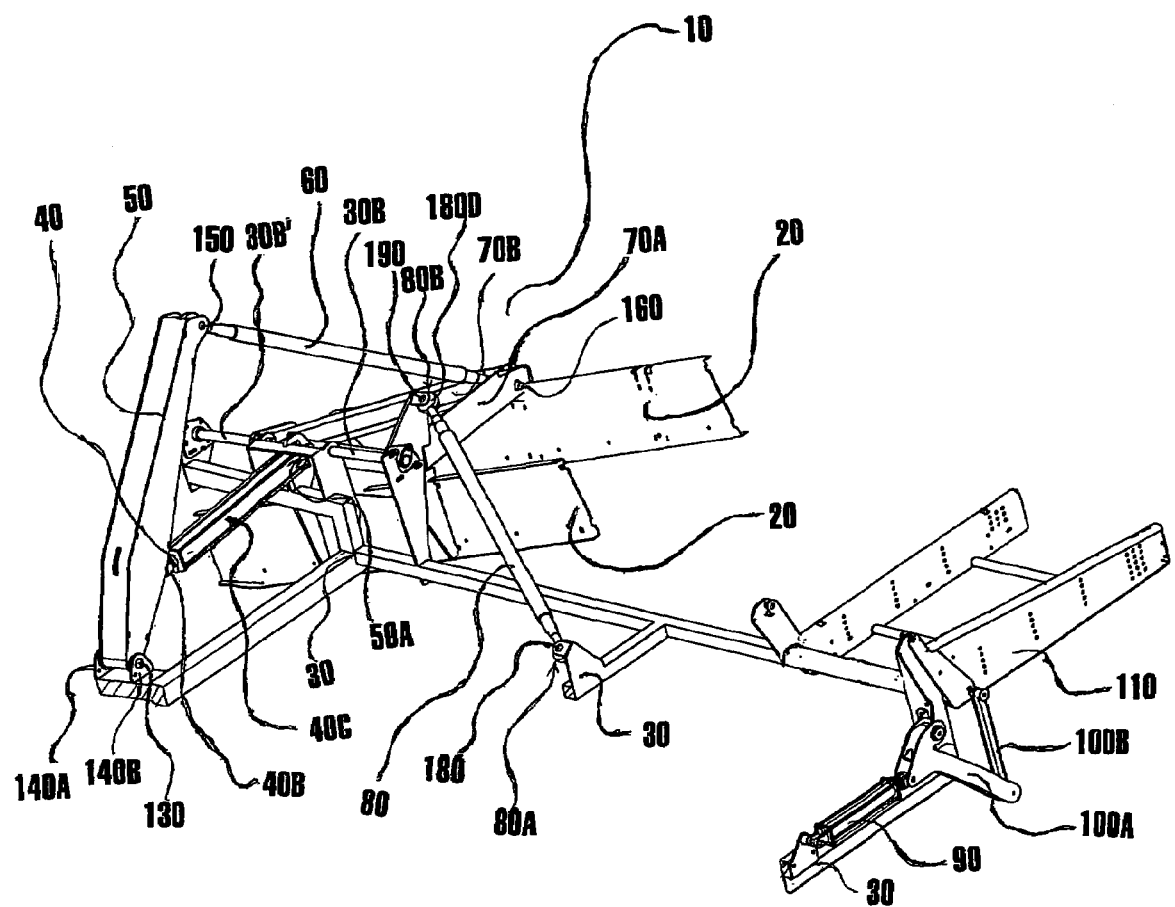
FIG. 1 is a perspective view of an embodiment of the assembly of the present invention connected to a portion of a first frame of a harvester and to a portion of a conveyor frame.

FIGS. 1, 2, 3, 4, 5 and 6 illustrate a preferred embodiment of an assembly for moving and rotating a conveyor. In standard operation the assembly 10 is operatively connected to (1) a conveyor frame referred to in general by numeral 20, and particularly, a frame for an endless conveyor attached as an elevator to a harvester and (2) a first frame 30 of the harvester.

With attention directed to figures FIGS. 1, 2, 3, 4, 5 and 6, it is seen that a preferred embodiment of the assembly 10 includes: (1) an actuator 40 operatively connected proximate a first actuator end 40A to the first frame 30; (2) an arm 50 pivotally connecting proximate a first arm end 50A to the first frame 30 and operatively connecting to the actuator 40 at an intermediate connection area 50B; (3) a support sub-assembly 70 slidingly connected to the first frame 30 and being both rotatable around, and moveable forward and rearward along an axis (the axis being illustrated generally as Z in FIGS. 4, 5 and 6), the sub-assembly 70 operatively connecting at a plurality of sub-assembly connection areas to the conveyor frame 20; (4) a first turnbuckle 60 pivotally connected proximate a first turnbuckle end 60A to the arm 50 and operatively connecting proximate a first additional turnbuckle end 60B to the support sub-assembly 70; and (5) a second turnbuckle 80 pivotally connected proximate a second turnbuckle end 80A to the first frame 30 and proximate a second additional turnbuckle end 80B to the support sub-assembly 70. The assembly 10 can additionally include a second actuator 90 operatively connected proximate a second actuator end 90A to the first frame 30 and operatively connected through a plurality of pivotally attached connection arms 10A, 100B to a hopper 110.

In a preferred embodiment of the assembly 10 principally seen in FIGS. 1, 2, 4, 5 and 6, the actuator 40 includes a single hydraulic ram having a piston 40B, a cylinder 40C and a pair of actuator ends 40A, 40A', at least one actuator end having at least one ram tab 40D proximate thereto and rigidly connected therewith, the ram tab 40D having an aperture disposed therethrough. A pivotal connection between the arm 50 and the actuator 40 is preferably formed by a first ram pin 120 inserted through at least one aperture through the arm 50 at the intermediate connection area 50B and through at least one hole through the ram tab 40D. In a preferred embodiment, the arm 50 is pivotally connected to the first frame 30, most preferably by an arm anchoring pin 130 inserted through apertures disposed through the arm 50 and a plurality of frame tabs 140A, 140B connected to the first frame 30. The actuator 40 may thus function to partially rotate the arm 50 radially around the arm anchoring pin 130.

In a preferred embodiment of the assembly 10 primarily seen in FIGS. 1, 2, 3, 4, 5 and 6, the first turnbuckle 60 pivotally connects proximate a first turnbuckle end 60A to the arm 50 and operatively connects proximate a first additional turnbuckle end 60B to the conveyor frame 20. The pivotal connection between the first turnbuckle 60 and the arm 50 is preferably formed by a first turnbuckle bearing 60C disposed around a first turnbuckle connection pin 150, the pin 150 being inserted through a plurality of apertures in the arm 50 more distally located from the arm anchoring pin 130 than from the intermediate connection area 50B.

Figure 3:
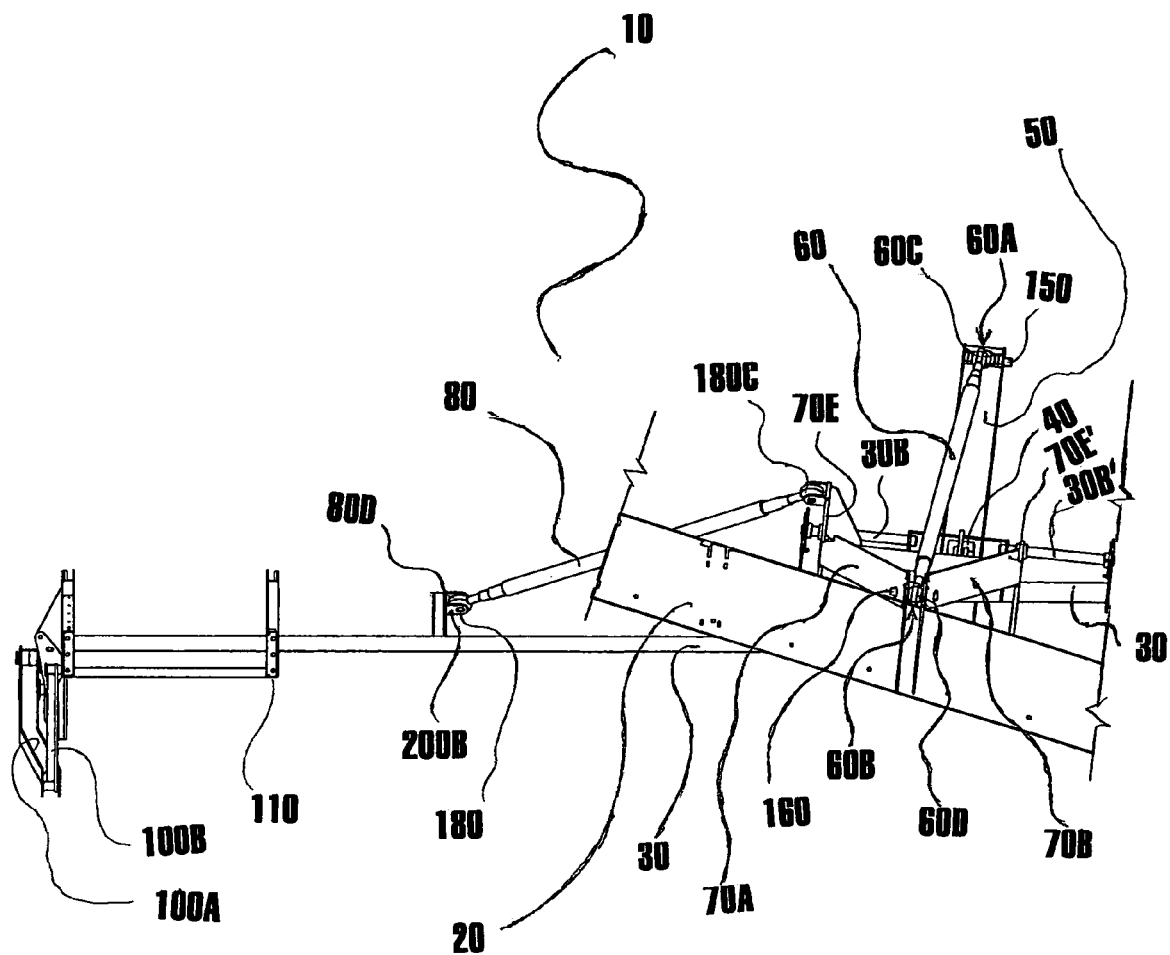
FIG. 3 is an elevated side plan view of an embodiment of the assembly of the present invention connected to a portion of a first frame of a harvester and to a portion of a conveyor frame.
Figure 4:
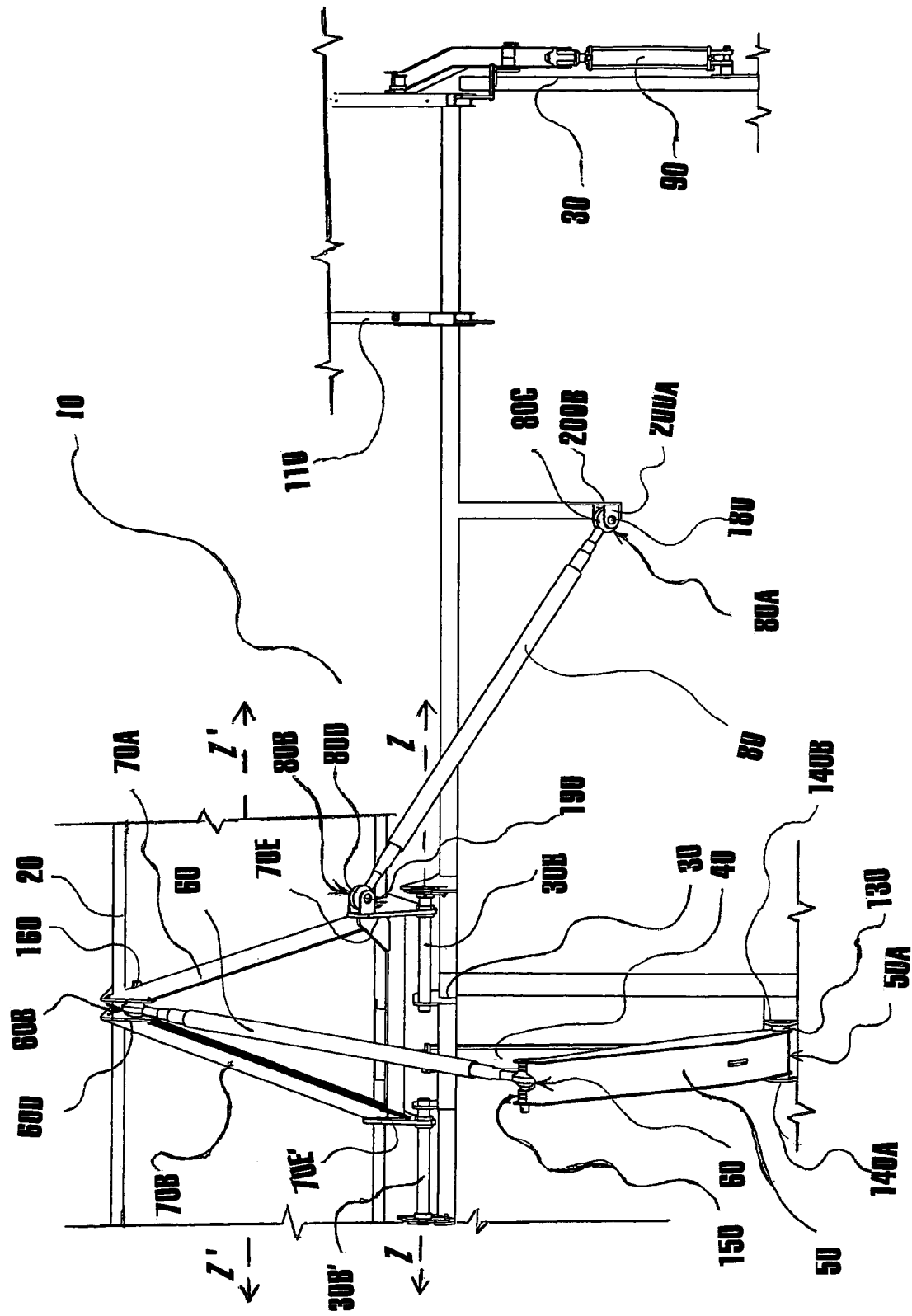
FIG. 4 is a top plan view of an embodiment of the assembly of the present invention connected to a portion of a first frame of a harvester and to a portion of a conveyor frame.

The support sub-assembly 70 (FIGS. 5 and 6) in a preferred embodiment includes a plurality of sub-assembly members 70A, 70B (FIGS. 1, 3 and 4) and a plurality of sub-assembly connection tabs 70E, 70E' (FIGS. 1, 3 and 4). The support sub-assembly 70 slidingly, pivotally and operatively connects to a first rod 30B (FIGS. 1, 3, 4, 5 and 6) of the first frame 30, the rod 30B being inserted through an aperture disposed through a first sub-assembly connection tab 70E. A second rod 30B' (FIGS. 1, 3, 4, 5 and 6) of the first frame 30 is inserted in a second sub-assembly connection tab 70E' and further facilitates and forms a sliding, pivotal and operative connection between the support sub-assembly 70 and the first frame 30. The support sub-assembly 70 thus connects to the first frame 30, is moveable forward and rearward along the rods 30B, 30B' and is rotatable around axis Z (FIGS. 4, 5 and 6), axis Z being disposed through the longitudinal midline of the rods 30B, 30B'. In a preferred embodiment: (1) the rods 30B, 30B' are rigidly joined to the remainder of the first frame 30 at welded connections or, alternatively, by fasteners; and (2) axis Z does not intersect any part of the conveyor frame 20 and is most preferably disposed parallel to a plane (containing vertical axis X' and line Z' illustrated generally in FIG. 5), the plane including the longitudinal midline Z' of the conveyor frame 20.

In a preferred embodiment primarily seen in FIGS. 1, 2, 3, 4, 5 and 6 the first turnbuckle 60 operatively connects to the conveyor frame 20, most preferably through the support sub-assembly 70. In the embodiment shown, the pivotal operative connection between the first turnbuckle 60 and the conveyor frame 20 is preferably formed by a first additional turnbuckle bearing 60D disposed around a first additional turnbuckle connection pin 160, the pin 160 being inserted through a plurality of apertures in the support sub-assembly 70.

In a preferred embodiment principally seen in FIGS. 1, 2, 3, 4, 5 and 6, the second turnbuckle 80 pivotally connects proximate a second turnbuckle end 80A to the first frame 30 and proximate a second additional turnbuckle end 80B to the support sub-assembly 70. In the embodiment shown: (1) the pivotally operative connection between the second turnbuckle 80 and the first frame 30 is preferably formed by a second turnbuckle bearing 80C disposed around a second turnbuckle connection pin 180, the connection pin 180 being inserted through a plurality of apertures disposed through a second plurality of frame tabs 200A, 200B and (2) the pivotal operative connection between the second turnbuckle 80 and the support sub-assembly 70 is preferably formed by a second additional turnbuckle bearing 80D disposed around a second additional turnbuckle connection pin 190, the connection pin 190 being inserted through a plurality of apertures in the support sub-assembly 70.

Figure 2:
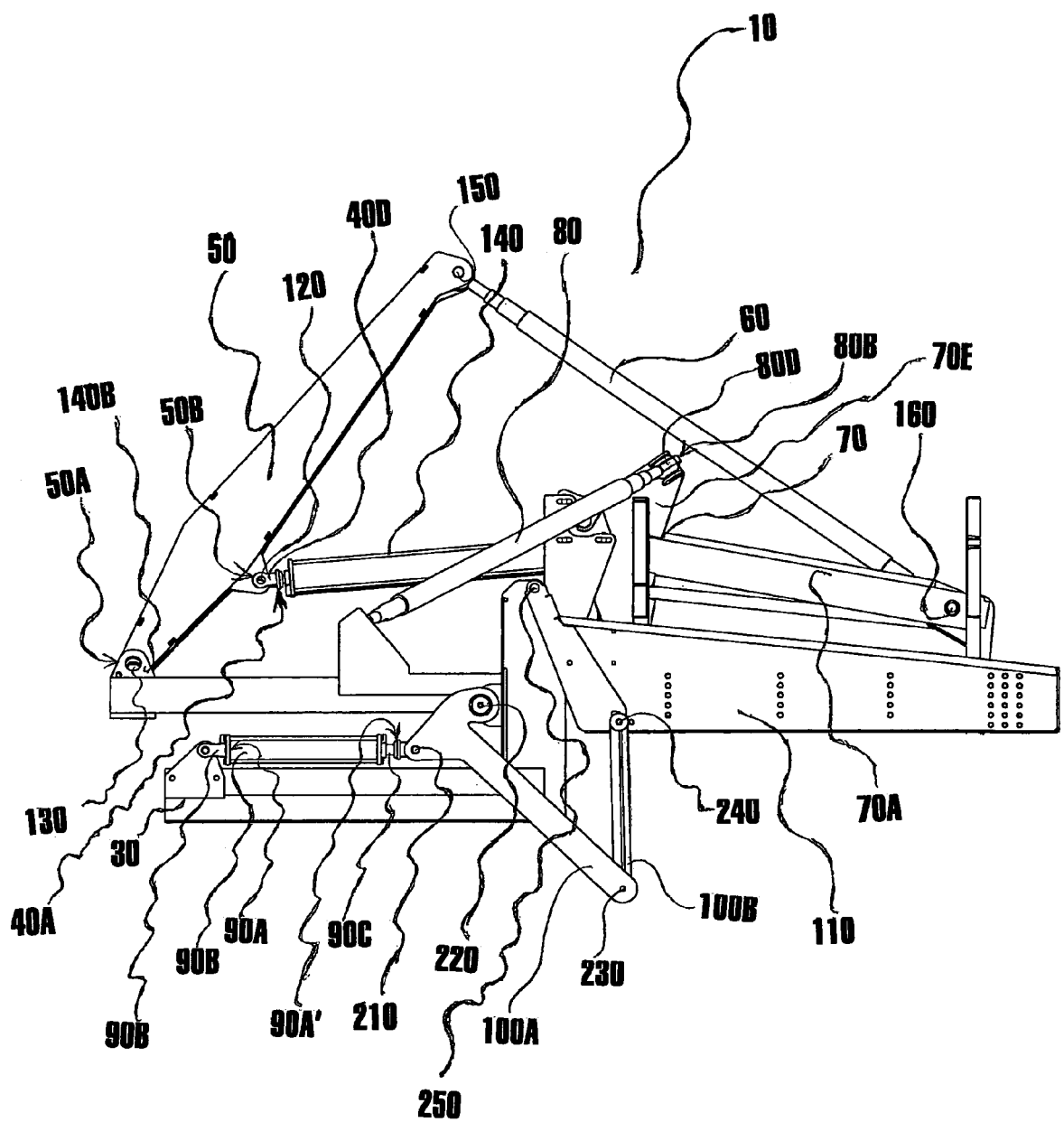
FIG. 2 is a front plan view of an embodiment of the present invention connected to a portion of a first frame of a harvester and to a portion of a conveyor frame.
Figure 5:
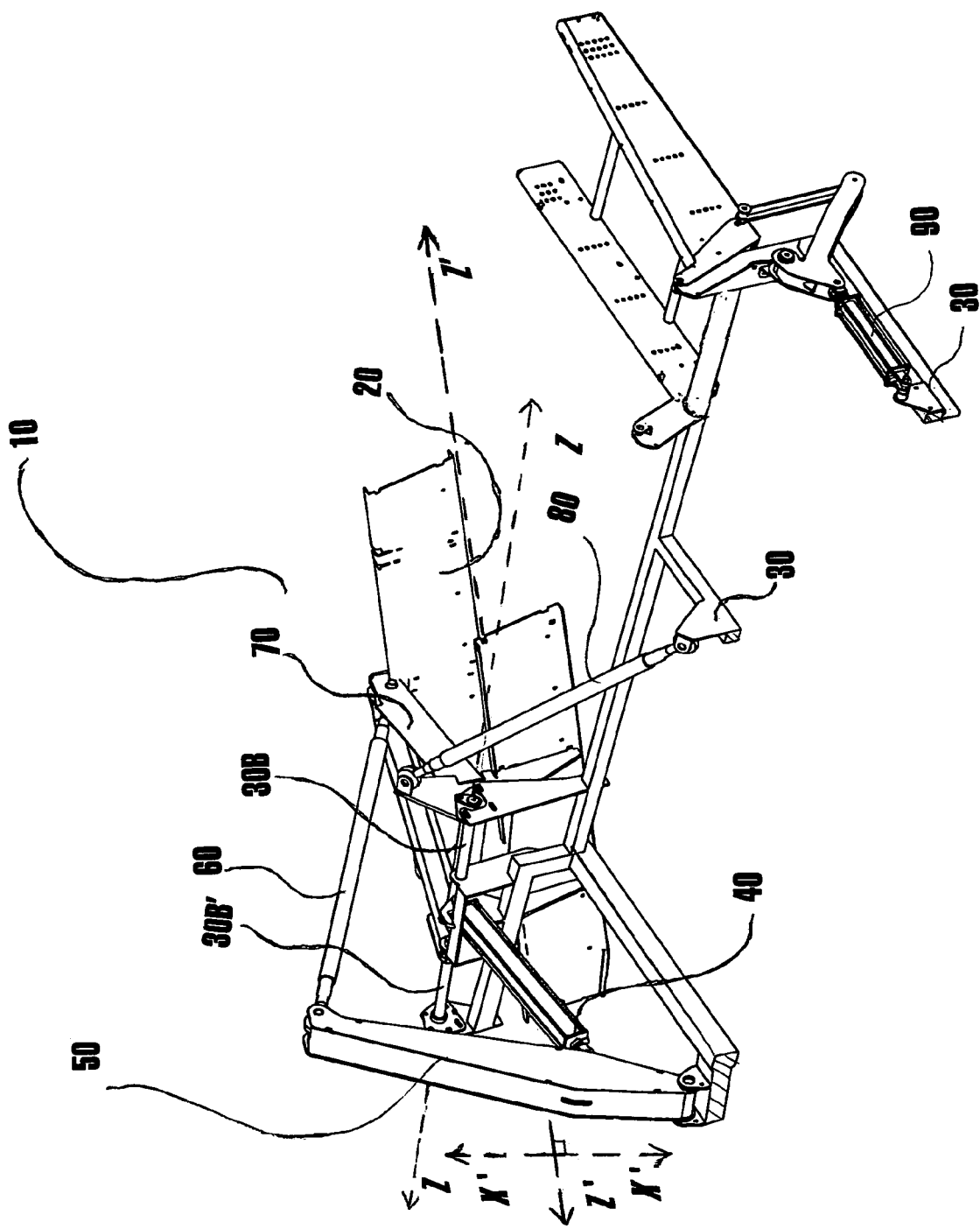
FIG. 5 is a perspective view of an embodiment of the assembly of the present invention connected to a portion of a first frame of a harvester and to a portion of a conveyor frame.
Figure 6:
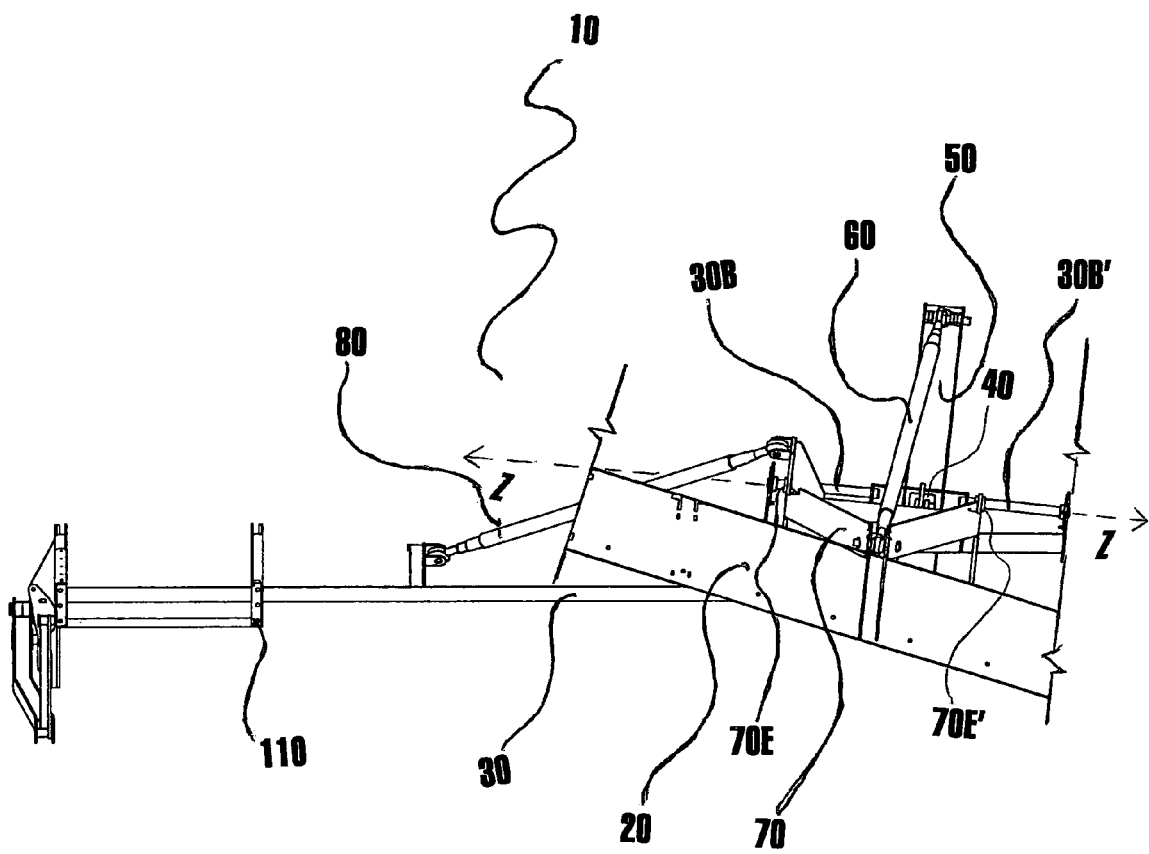
FIG. 6 is an elevated side plan view of an embodiment of the assembly of the present invention connected to a portion of a first frame of a harvester and to a portion of a conveyor frame.
Figure 7:
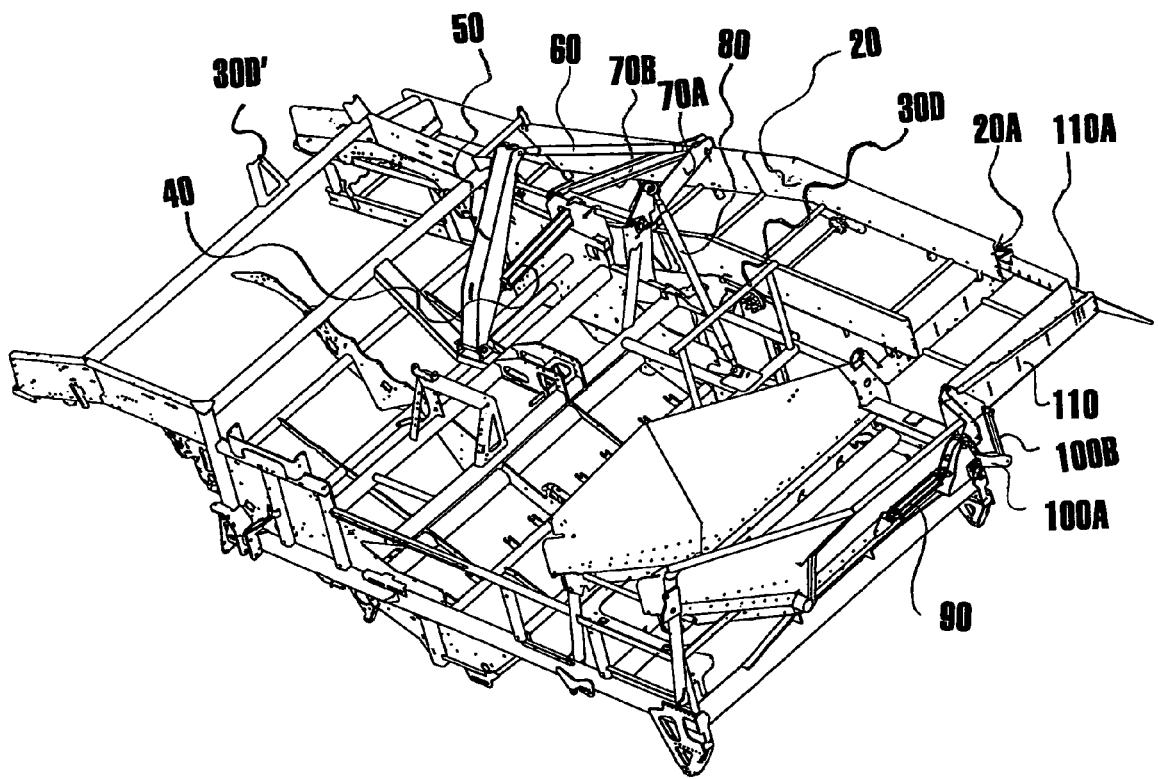
FIG. 7 is a perspective view of an embodiment of the assembly of the present invention in an operational orientation connected to a first frame of a harvester and to a conveyor frame.

With attention directed primarily to FIGS. 1, 2 and 5, it is further seen that a preferred embodiment of the assembly 10 may include a second actuator 90 operatively connected proximate a second actuator end 90A to the first frame 30 and, through a plurality of pivotally attached connection arms 100A, 100B, to a hopper 110. In the embodiment shown: (1) the second actuator 90 includes a second hydraulic ram having a piston 90B, a cylinder 90C and a pair of actuator ends 90A, 90A', each actuator end having at least one ram tab 90D, 90D' proximate thereto and rigidly connected therewith, the ram tab 90D having an aperture disposed therethrough; (2) a pivotal connection between the first connection arm 100A and the second actuator 90 is preferably formed by a second ram pin 210 inserted through at least one aperture through the first connection arm 100A; (3) a pivotal connection between the first connection arm 100A and the first frame 30 is preferably formed by a first connection arm pin 220 inserted through at least one aperture through the first connection arm 100A and through at least one aperture through a connection arm frame tab 30C; (4) a pivotal connection between the second connection arm 100B and the first connection arm 100A is preferably formed by a first connection arm pin 230 inserted through at least one aperture through the second connection arm 100B and at least one aperture through the first connection arm 100A; (5) a pivotal connection between the second connection arm 100B and the hopper 110 is preferably formed by a hopper connecting pin 240 inserted through at least one aperture through the second connection arm 100B and at least one aperture through a portion of the hopper 110; and (6) the hopper 110 is pivoted around and connected to the first frame 30 by a hopper frame connection pin 250 and includes a frame of a receiving portion of an immediate downstream conveyor.

The operation and function of the assembly 10 is perhaps best understood by considering the preferred embodiment principally shown in FIGS. 1, 2, 3, 4, 5 and 6 in context with a complete harvester frame and a complete conveyor frame as generally seen in FIGS. 7, 8, 9 and 10. In standard operation of a preferred embodiment of the assembly 10: (1) the actuator 40, the arm 50 and the first turnbuckle 60 function in concert to selectively rotate the support sub-assembly 70 and conveyor frame 20 around axis Z (FIGS. 4, 5 and 6) between a stable operational orientation (FIGS. 4, 5, 6, 7, 8, 9 and 10) and a stable folded transport orientation (FIG. 8 and in phantom broken lines in FIGS. 9 and 10); and (2) the second turnbuckle 80 influences the conveyor frame 20 to move selectively forward and rearward as the support sub-assembly 70 and conveyor frame 20 are rotated around axis Z. When in folded transport orientation, the conveyor frame 20 rests on a plurality of cradling elements 30D, 30D' (FIGS. 7, 8 and 9) upon the first frame 30. A hopper 110 may be disposed in an operational configuration (FIGS. 7 and 10) beneath a discharge end 20A of the conveyor. After the conveyor frame 20 is rotated from operational orientation to folded transport orientation and simultaneously moved rearward a distance (illustrated generally as D in FIG. 10) under influence of the second turnbuckle 80 thus clearing a path for rotation of the hopper 110, the second actuator 90 functions to move the attached connection arms 10A, 100B and rotate the hopper 110 from a stable operational configuration (FIGS. 4, 5, 6, 7, 8, 9 and 10) to a stable folded transport configuration (FIG. 8 and in phantom broken lines in FIGS. 9 and 10). When in folded transport configuration, the hopper 110 preferably rests on a hopper cradling element 110A upon the first frame 30.

After transport, the hopper 110 and conveyor 20 in a preferred embodiment shown are deployed for further operation by: (1) utilizing the actuator 40, the arm 50 and the first turnbuckle 60 to selectively rotate the support sub-assembly 70 and conveyor frame 20 around axis Z between the folded transport orientation (FIG. 8 and in phantom broken lines in FIGS. 9 and 10) and the operational orientation (FIGS. 4, 5, 6, 7, 8, 9 and 10); and (2) utilizing the second turnbuckle 80 to influence the conveyor frame 20 to selectively move forward a distance (shown generally as D in FIG. 10) and rearward as the support sub-assembly 70 and conveyor frame 20 are rotated around axis Z. Before the conveyor frame 20 is unfolded from transportation orientation to operational orientation, the second actuator 90 functions to move the attached connection arms 10A, 100B and rotate the hopper 110 from folded transport configuration (FIG. 8 and in phantom in FIGS. 9 and 10) to operational configuration (FIGS. 4, 5, 6, 7, 8, 9 and 10). The hopper 110 is thus rapidly, efficiently and easily deployed in a stable operational configuration for harvesting beneath a discharge end 20A of the conveyor.

Figure 8:
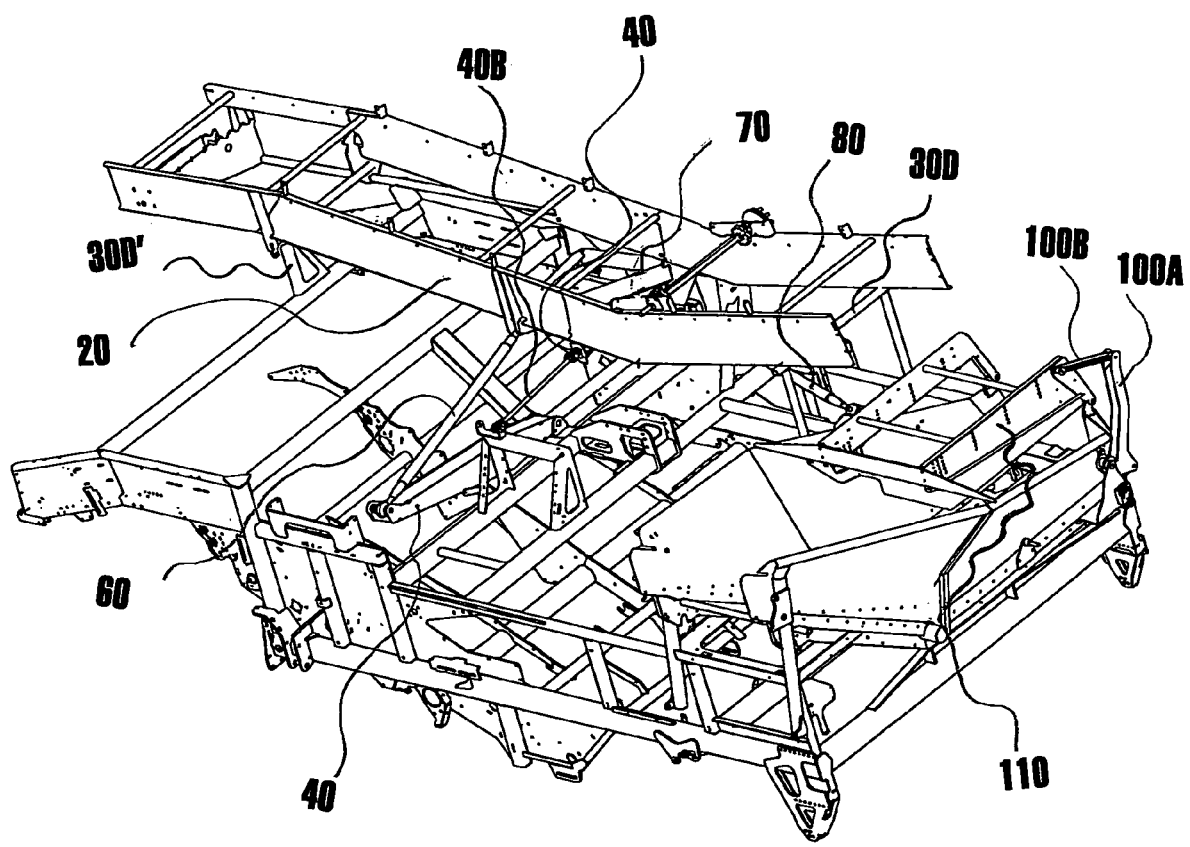
FIG. 8 is a perspective view of an embodiment of the assembly of the present invention in transport orientation connected to a first frame of a harvester and to a conveyor frame.
Figure 9:
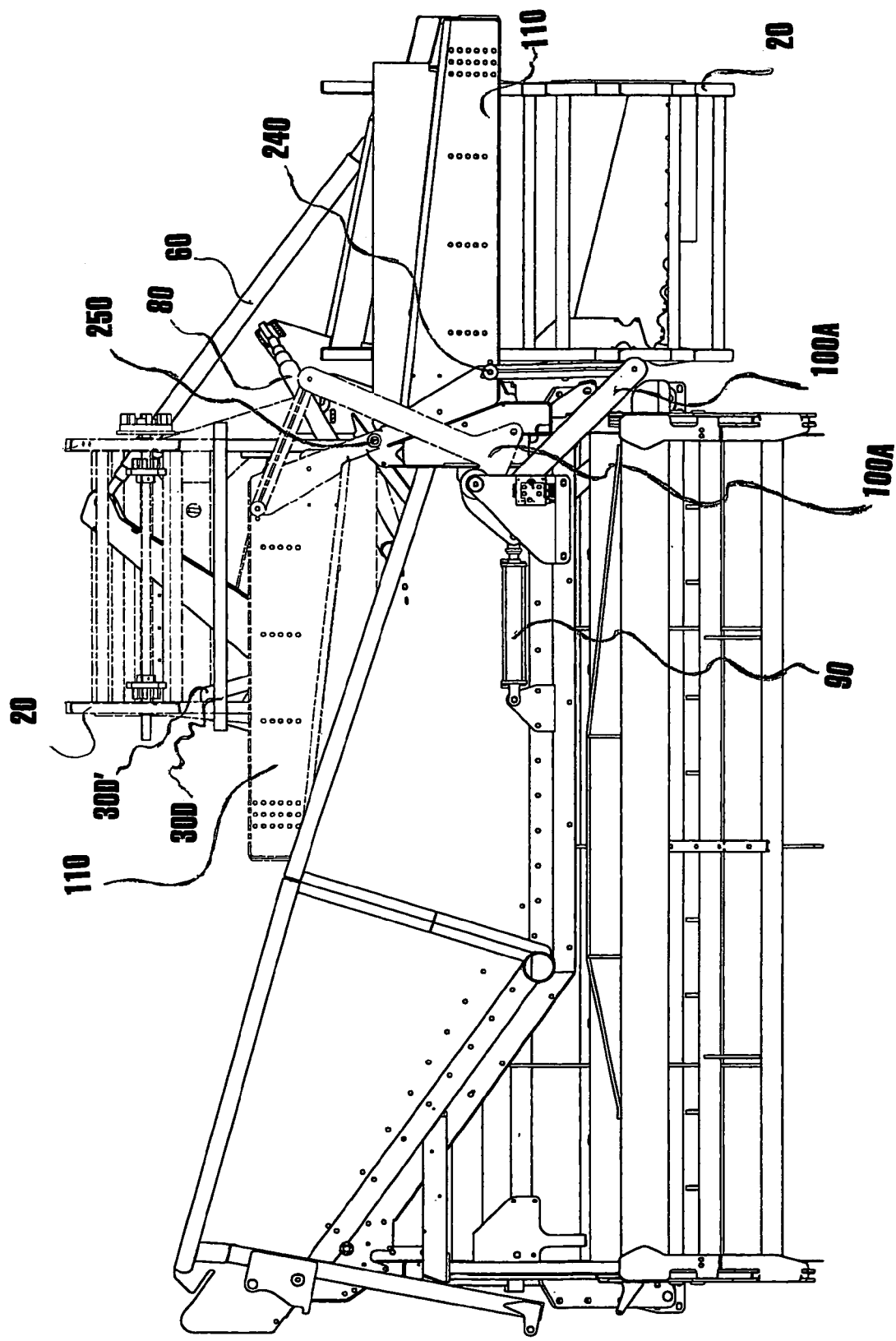
FIG. 9 is a front plan view of an embodiment of the present invention in an operational orientation connected to a first frame of a harvester and to a conveyor frame with an alternate transport orientation shown in phantom lines.
Figure 10:
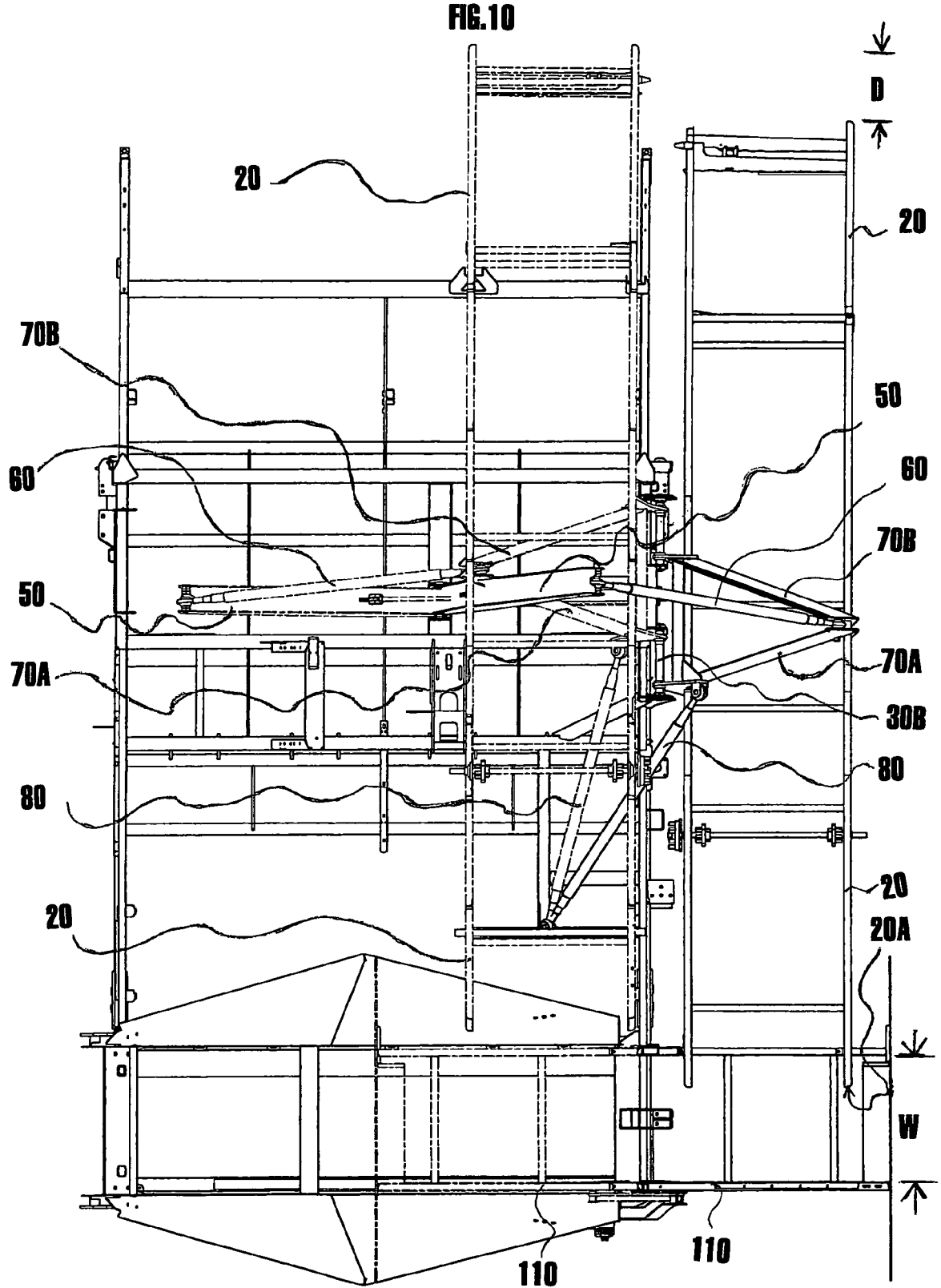
FIG. 10 is a top plan view of an embodiment of the present invention in an operational orientation connected to a first frame of a harvester and to a conveyor frame with an alternate transport orientation shown in phantom lines.

The assembly 10 of the present invention thus includes means for selectively rotating the support sub-assembly 70 and the conveyor frame 20 around an axis Z between an operational orientation (FIGS. 4, 5, 6, 7, 8, 9 and 10) and a folded transport orientation (FIG. 8 and in phantom in FIGS. 9 and 10). In the embodiment shown, these means for rotating include: (1) an actuator 40 operatively connected proximate a first actuator end 40A to the first frame 30; (2) an arm 50 pivotally connecting proximate a first arm end 50A to a first connection area 30A of the first frame 30 and operatively connecting to the actuator 40 at an intermediate connection area 50B; and (3) a first turnbuckle 60 pivotally connected proximate a first turnbuckle end 60A to the arm 50 and operatively connecting proximate a first additional turnbuckle end 60B to the support sub-assembly 70, the support sub-assembly being operatively connected to the conveyor frame 20.

The assembly 10 thus also includes means for influencing the support sub-assembly 70 and the conveyor frame 20 to move selectively forward and rearward along the axis Z during rotation of the support sub-assembly 70 and conveyor frame 20 and thereby clearing a path for selective rotation of the hopper 110 between an operational configuration (FIGS. 4, 5, 6, 7, 8, 9 and 10) beneath the discharge end 20A of the conveyor frame 20 and a folded transport configuration (FIG. 8 and in phantom in FIGS. 9 and 10). In the embodiment shown, these means for influencing include a second turnbuckle 80 pivotally connected proximate a second turnbuckle end 80A to the first frame 30 and proximate a second additional turnbuckle end 80B to the support sub-assembly 70.

In a preferred embodiment shown: (1) the means for rotating function to rotate the support sub-assembly 70 and the conveyor frame 20 at least 165 degrees and not more than 195 degrees and ideally 180 degrees around axis Z between the operational orientation (FIGS. 4, 5, 6, 7, 8, 9 and 10) and the folded transport orientation (FIG. 8 and in phantom in FIGS. 9 and 10) and (2) the means for influencing the support sub-assembly 70 and the conveyor frame 20 to move selectively forward and rearward a distance (illustrated generally as D in FIG. 10), distance D being at least 15 percent but not more than 25 percent of a width of receiving portion of immediate downstream conveyor W (FIG. 10), distance D being preferably at least 8 inches but not more than 18 inches. The assembly 10 functions to clear a path for rapid, efficient, selective rotation of a hopper 110 between a stable operational configuration beneath a discharge end 20A of the conveyor frame and a folded transport configuration upon the first frame 30.

The foregoing is considered as illustrative only of the principles of the invention. Since modifications and changes will occur to those skilled in the art, it is not desired to limit the invention to the exact construction and operation shown and described, and, accordingly, all suitable modifications and equivalents may be resorted to, falling within the scope of the invention. The materials used in construction of the apparatus include metallic elements, metallic alloys and polymers which provide strength, durability and rust resistance.

What is claimed is:

1. An assembly for moving and rotating a conveyor particularly a conveyor frame comprising:
    an actuator operatively connecting to a first frame;
    an arm operatively connecting to said actuator and pivotally connecting to said first frame;
    a support sub-assembly operatively connected to said first frame and selectively moveable forward and rearward along an axis, said support sub-assembly operatively connecting to said conveyor frame;
    a first turnbuckle operatively connected to said arm, said first turnbuckle operatively connecting to said support sub-assembly;
    a second turnbuckle pivotally connected to said first frame, said second turnbuckle operatively connecting to said support sub-assembly; and
    wherein said actuator, said arm and said first turnbuckle selectively rotate said support sub-assembly around said axis and between an operational orientation and a folded transport orientation and said second turnbuckle influences said conveyor frame to move selectively forward and rearward as said support sub-assembly is rotated around said axis.

2. An assembly as in claim 1 wherein said support sub-assembly comprises:
    a plurality of sub-assembly members;
    a first sub-assembly connection tab;
    wherein said support sub-assembly pivotally and slidingly connects to a first rod of said first frame, said first rod being inserted through a first sub-assembly connection tab of said support sub-assembly; and
    wherein said support sub-assembly is operatively connected to said first frame, movable forward and rearward along said first rod, and simultaneously rotatable around said axis, said axis being disposed though a longitudinal midline of said first rod.

3. An assembly as in claim 1 wherein said support sub-assembly comprises:
    a plurality of sub-assembly members;
    a plurality of sub-assembly connection tabs;
    wherein said support sub-assembly pivotally and slidingly connects to a first rod of said first frame, said first rod being disposed through a first sub-assembly connection tab of said support sub-assembly;
    wherein said support sub-assembly pivotally and slidingly connects to a second rod of said first frame, said second rod being disposed through a second sub-assembly connection tab of said support sub-assembly; and
    wherein said support sub-assembly is operatively connected to said first frame, movable forward and rearward along said first rod and said second rod, and simultaneously rotatable around said axis, said axis being disposed though a longitudinal midline of said first rod and said second rod.

4. An assembly as in claim 1 wherein said actuator is a single hydraulic ram.

5. An assembly as in claim 1 wherein said axis does not intersect any part of said conveyor.

6. An assembly as in claim 5 wherein said axis is disposed parallel to a plane, said plane including a longitudinal midline of said conveyor frame.

7. An assembly as in claim 1 wherein said sub-assembly and said conveyor frame are rotated at least 165 degrees and not more than 195 degrees around said axis between said operational orientation and said folded transport orientation while simultaneously being moved forward and rearward along said axis at least 8 inches but not more than 18 inches.

8. An assembly as in claim 1 wherein said sub-assembly and said conveyor frame are rotated 180 degrees around said axis between said operational orientation and said folded transport orientation while simultaneously being moved forward and rearward along said axis at least 8 inches but not more than 18 inches.

9. An assembly as in claim 1 wherein said sub-assembly and said conveyor frame are rotated at least 165 degrees and not more than 195 degrees around said axis between said operational orientation and said folded transport orientation while simultaneously being moved forward and rearward along said axis a distance equivalent to at least 15 percent but not more than 25 percent of a width of receiving portion of immediate downstream conveyor.

10. An assembly as in claim 1 wherein said sub-assembly and said conveyor frame are rotated 180 degrees around said axis between said operational orientation and said folded transport orientation while simultaneously being moved forward and rearward along said axis a distance equivalent to at least 15 percent but not more than 25 percent of a width of receiving portion of immediate downstream conveyor.

11. An assembly for moving and rotating a conveyor particularly a conveyor frame comprising:
   a support sub-assembly operatively connected to a first frame and selectively moveable forward and rearward along an axis, said support assembly operatively connecting to said conveyor frame and being movable forward and rearward with said conveyor frame;
   means for selectively rotating said support sub-assembly around said axis between an operational orientation and a folded transport orientation;
   means for influencing said support sub-assembly and said conveyor frame to move selectively forward and rearward along said axis during rotation; and
   wherein said axis does not intersect any part of said conveyor.

12. An assembly as in claim 11 wherein said axis is disposed parallel to a plane, said plane including a longitudinal midline of said conveyor frame.

13. An assembly as in claim 11 wherein said support sub-assembly comprises:
   a plurality of sub-assembly members;
   a first sub-assembly connection tab;
   wherein said support sub-assembly pivotally and slidingly connects to a first rod of said first frame, said first rod being inserted through a first sub-assembly connection tab of said support sub-assembly; and
   wherein said support sub-assembly is operatively connected to said first frame, movable forward and rearward along said first rod, and simultaneously rotatable around said axis, said axis being disposed though a longitudinal midline of said first rod.

14. An assembly as in claim 11 wherein said support sub-assembly comprises:
   a plurality of sub-assembly members;
   a plurality of sub-assembly connection tabs;
   wherein said support sub-assembly pivotally and slidingly connects to a first rod of said first frame, said first rod being disposed through a first sub-assembly connection tab of said support sub-assembly;
   wherein said support sub-assembly pivotally and slidingly connects to a second rod of said first frame, said second rod being disposed through a second sub-assembly connection tab of said support sub-assembly; and
   wherein said support sub-assembly is operatively connected to said first frame, movable forward and rearward along said first rod and said second rod, and simultaneously rotatable around said axis, said axis being disposed though a longitudinal midline of said first rod and said second rod.

15. An assembly as in claim 11 wherein said means for selectively rotating said support sub-assembly around said axis between an operational orientation and a folded transport orientation comprise an actuator, said actuator being a single hydraulic ram.

16. An assembly as in claim 11 wherein said sub-assembly and said conveyor frame are rotated at least 165 degrees but not more than 195 degrees around said axis between said operational orientation and said folded transport orientation while simultaneously being moved forward and rearward along said axis at least 8 inches but not more than 18 inches.

17. An assembly as in claim 11 wherein said sub-assembly and said conveyor frame are rotated 180 degrees around said axis between said operational orientation and said folded transport orientation while simultaneously being moved forward and rearward along said axis at least 8 inches but not more than 18 inches.

18. An assembly as in claim 11 wherein said sub-assembly and said conveyor frame are rotated at least 165 degrees and not more than 195 degrees around said axis between said operational orientation and said folded transport orientation while simultaneously being moved forward and rearward along said axis a distance equivalent to at least 15 percent but not more than 25 percent of a width of receiving portion of immediate downstream conveyor.

19. An assembly as in claim 11 wherein said sub-assembly and said conveyor frame are rotated 180 degrees around said axis between said operational orientation and said folded transport orientation while simultaneously being moved forward and rearward along said axis a distance equivalent to at least 15 percent but not more than 25 percent of a width of receiving portion of immediate downstream conveyor.

20. An assembly for moving and rotating a conveyor particularly a conveyor frame comprising:
   an actuator operatively connecting to a first frame;
   an arm operatively connecting to said actuator and pivotally connecting to said first frame;
   a support sub-assembly operatively connected to said first frame and selectively moveable forward and rearward along an axis, said support sub-assembly operatively connecting to said conveyor frame;
   a first turnbuckle operatively connected to said arm, said first turnbuckle operatively connecting to said support sub-assembly;
   a second turnbuckle pivotally connected to said first frame, said second turnbuckle operatively connecting to said support sub-assembly;
   a second actuator operatively connected to said first frame and, through a plurality of pivotally attached connection arms, to a hopper;
   wherein said actuator, said arm and said first turnbuckle selectively rotate said support sub-assembly around said axis and between an operational orientation and a folded transport orientation and said second turnbuckle influences said conveyor frame to move selectively forward and rearward as said support sub-assembly is rotated around said axis clearing said conveyor frame away for selective rotation of said hopper between an operational configuration beneath a discharge end of said conveyor and a folded transport configuration upon said first frame; and
   wherein said second actuator and said plurality of pivotally attached connection arms selectively rotate said hopper from an operational configuration to a folded storage configuration.

* * * * *